United States Patent Office 3,333,807
Patented Aug. 1, 1967

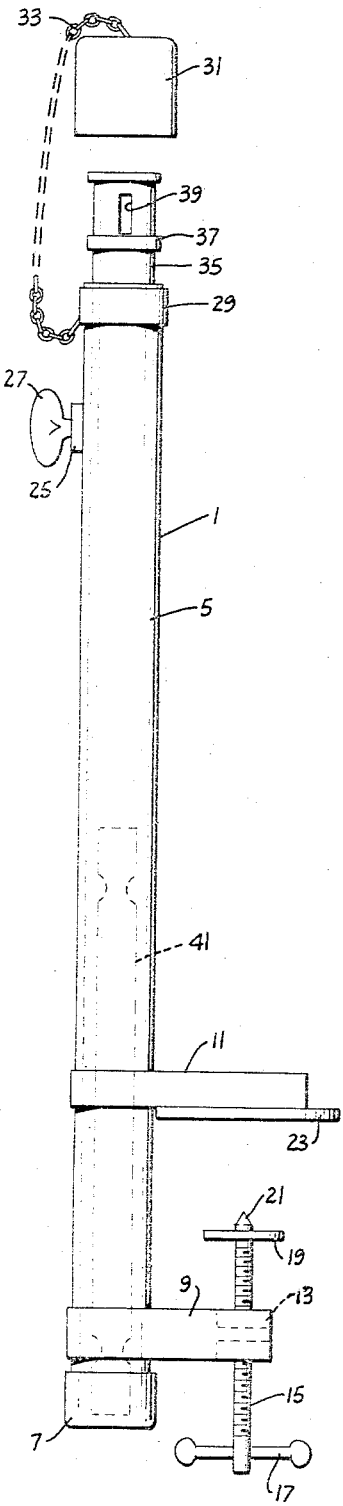
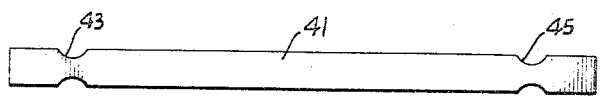
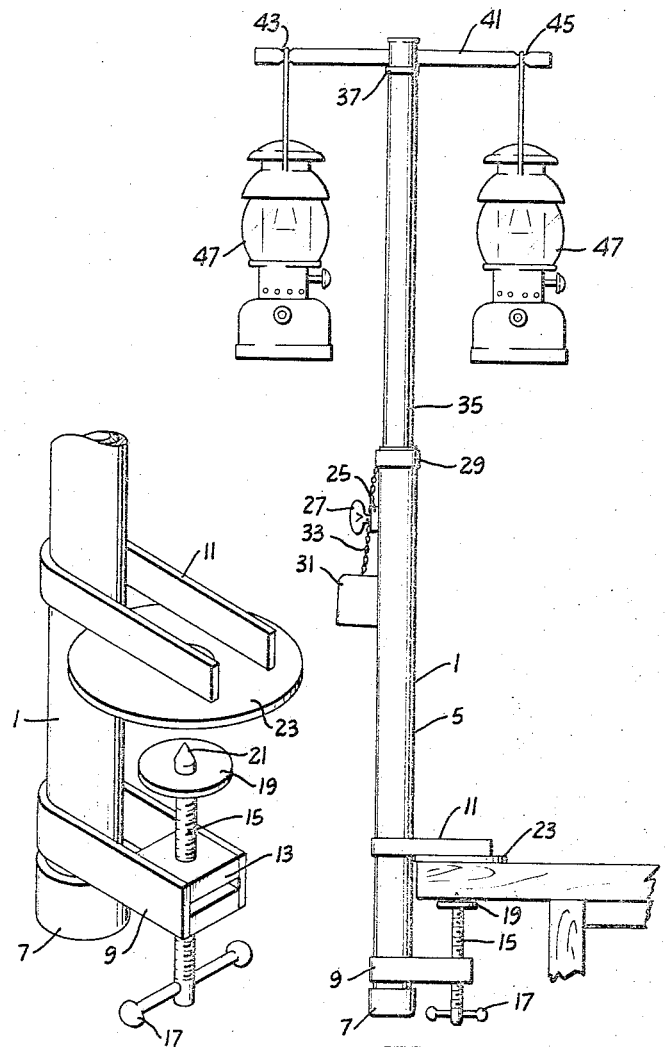

3,333,807
CAMPING LIGHT SUPPORT
Richard J. Locatelli, 2684 Placer,
Santa Cruz, Calif. 95060
Filed July 21, 1965, Ser. No. 473,624
1 Claim. (Cl. 248—226)

ABSTRACT OF THE DISCLOSURE

A dual lantern support is provided by employing a two piece hollow collapsible tubular post which has means at one end for clamping the outer tube to a table or the like and a transverse slot means at the other end for supporting a rectangular cross bar on the end of the inner tube. The bar has a pair of notches in the upper and lower faces adjacent each end. In collapsed position the bar is housed in the inner tube. The outer tube also carries at its upper end a chain secured cap which is employed to close the upper end of the tubes when collapsed and for retaining the bar within the inner tube.

---

This invention relates to a support structure, and more particularly relates to a structure for supporting one or more gasoline lanterns or similar articles and which is particularly adapted for use by campers.

When camping, gasoline lanterns and similar lights are ordinarily placed on a camp table where they are subject to being overturned and are in the way, and also the light glares directly into the eyes of the user. In accordance with the present invention, a support is provided so that one or more camp lanterns can be conveniently supported in a secure fashion at a suitable height over a camp table or similar structure.

Accordingly, it is an object of the present invention to provide a support member for one or more camp lanterns.

Another object of this invention is to provide a support member of folding structure so that the device occupies a minimum of space for storage and transportation.

Another object of this invention is to provide a folding support member of compact structure wherein a resilient member is used to hold all the parts together when in collapsed form so that there is no possibility of losing any of the parts.

Other objects will be apparent from the balance of the specification which follows.

In the drawings forming a part of this application:

FIGURE 1 is a side view of a device embodying the present invention.

FIGURE 2 is a side view of a device embodying the present invention, illustrating its method of use.

FIGURE 3 is a side view of the cross member.

FIGURE 4 is an enlarged view of the base end of the support of the present invention.

Turning now to a description of the drawing by reference characters, the device includes an outer tube 5. Near the bottom of the tube are welded two U-shaped members 9 and 11. The lower member 9 has a threaded insert 13 welded therein through which a screw 15 passes. The lower end of the screw 15 is provided with a handle 17, while the upper end is provided with a disc 19 through which a point 21 extends. The upper U-shaped member 11 has a disc 23 welded to its lower surface. The structure thus described provides a clamp which is adapted to clamp the device onto a table or the like as is shown in FIGURE 2. Near the upper part of the tube, a threaded member 25 is provided having a set screw 27 therein, and at the top of the tube a collar 29 is provided to which is attached a resilient cap, preferably of plastic, 31, retained by a ball chain 33. An inner tube 35 is concentric with and makes a sliding fit inside of the tube 5. Tube 35 has a collar 37 thereon with an upper slot 39.

A cross member 41 having notches 43 and 45 near each end thereof completes the structure. As is shown in FIGURE 1, the cross member 41 is normally stored inside of the tube 35 and is retained from loss by means of the cap 31. Normally for storage, the tube 35 is slid as far as possible into the tube 5. In use, the cap is removed and the cross member 41 is placed in the slot 39. Tube 35 is extended to a desired height, and the set screw 25 employed to clamp the inner tube to the desired height. In use, the device can be used to hang one or more camp lanterns as at 47, or the support member can be used to support other articles, such as a small radio, clothing, or the like.

It is believed apparent from the foregoing that I have provided a simple, yet effective, clamp structure whereby a camp lantern or similar article can be supported in a secure manner at a convenient height, which member can be stored and carried in a compact form.

I claim:

A clamping light support or the like comprising in combination:
(a) a first tube;
(b) a clamp attached near the bottom of the first tube whereby the tube can be attached to a table or the like;
(c) a second tube fitted within the first tube and slidable therewith;
(d) a set screw near the top of the first tube whereby the second tube can be clamped in relationship with the first tube;
(e) a rectangular opening extending through the top of the second tube transversely thereof;
(f) a cross bar slidably and medially positioned in said opening and forming a dual supporting structure near the top of the second tube;
(g) said bar being rectangular in cross section and snugly received in said opening;
(h) a pair of notches oppositely positioned in the top and bottom sides of said cross bar adjacent each end thereof, whereby said bar is reversible;
(i) said first and second tubes being hollow for receiving the bar for storage; and
(j) a cap provided with a chain secured to the upper end of the first tube for closing the tubes when collapsed and for retaining said bar in said second tube.

References Cited

UNITED STATES PATENTS

| | | | |
|---|---|---|---|
| 1,329,173 | 1/1920 | Goldthwaite | 248—51 |
| 1,748,597 | 2/1930 | Collins | 211—172 |
| 1,865,757 | 7/1932 | Honsowetz | 211—172 |
| 2,296,043 | 9/1942 | McClary | 248—188 |
| 3,178,144 | 4/1965 | Kimoto | 248—229 |

FOREIGN PATENTS

| | | |
|---|---|---|
| 539,060 | 7/1955 | Belgium. |

CHANCELLOR E. HARRIS, Primary Examiner.

JOHN PETO, Examiner.